United States Patent
Mills

(10) Patent No.: US 9,955,073 B2
(45) Date of Patent: Apr. 24, 2018

(54) VIDEO USER INTERFACE SYSTEM AND METHOD

(71) Applicant: Sensormatic Electronics, LLC, Boca Raton, FL (US)

(72) Inventor: Lawrence R. Mills, Coral Springs, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 184 days.

(21) Appl. No.: 13/946,279

(22) Filed: Jul. 19, 2013

(65) Prior Publication Data

US 2013/0300822 A1 Nov. 14, 2013

Related U.S. Application Data

(63) Continuation of application No. 10/802,451, filed on Mar. 17, 2004.

(Continued)

(51) Int. Cl.
*H04N 5/341* (2011.01)
*H04N 5/232* (2006.01)
(Continued)

(52) U.S. Cl.
CPC ..... *H04N 5/23238* (2013.01); *G06F 3/04815* (2013.01); *G08B 13/19628* (2013.01);
(Continued)

(58) Field of Classification Search
None
See application file for complete search history.

(56) References Cited

U.S. PATENT DOCUMENTS

| 5,359,363 A | 10/1994 | Kuban et al. |
| 5,563,650 A | 10/1996 | Poelstra |

(Continued)

FOREIGN PATENT DOCUMENTS

| WO | 9750252 A1 | 12/1997 |
| WO | 9945511 A1 | 9/1999 |

OTHER PUBLICATIONS

Canadian Examiner's Report dated Jul. 5, 2013 for Canadian Application Serial No. 2,465,045, Canadian Filing Date: Apr. 22, 2004 consisting of 4 pages.

(Continued)

*Primary Examiner* — Christopher Findley
(74) *Attorney, Agent, or Firm* — Christopher & Weisberg, P.A.

(57) ABSTRACT

A system providing a graphical user interface incorporating fisheye image data captured by a first camera using a fisheye lens is provided. The system includes a buffer configured to receive the fisheye image data corresponding to a monitored area. A processor is in communication with the buffer. The fisheye image data is transformed into panoramic view data corresponding to a panoramic view of the monitored area using a panoramic transformation process. The fisheye image data is transformed into virtual view data corresponding to a partial view of the panoramic view using a virtual view transformation process different from the panoramic view transformation process. The panoramic view data and the virtual view data are encoded for display in the graphical user interface.

17 Claims, 6 Drawing Sheets

Related U.S. Application Data

(60) Provisional application No. 60/502,728, filed on Sep. 12, 2003.

(51) Int. Cl.
   *G06F 3/0481* (2013.01)
   *G08B 13/196* (2006.01)
   *H04N 7/18* (2006.01)

(52) U.S. Cl.
   CPC . *G08B 13/19682* (2013.01); *G08B 13/19689* (2013.01); *G08B 13/19691* (2013.01); *H04N 5/232* (2013.01); *H04N 5/23216* (2013.01); *H04N 7/181* (2013.01)

(56) References Cited

U.S. PATENT DOCUMENTS

| | | | |
|---|---|---|---|
| 5,870,135 A | 2/1999 | Glatt et al. | |
| RE36,207 E | 5/1999 | Zimmermann et al. | |
| 6,034,716 A | 3/2000 | Whiting et al. | |
| 6,624,846 B1 | 9/2003 | Lassiter | |
| 6,833,843 B2 * | 12/2004 | Mojaver et al. | 345/647 |
| 7,103,232 B2 | 9/2006 | Kotake et al. | |
| 7,206,017 B1 | 4/2007 | Suzuki | |
| 2002/0005896 A1 | 1/2002 | Kumata et al. | |
| 2002/0080017 A1 | 6/2002 | Kumata et al. | |
| 2002/0147991 A1 * | 10/2002 | Furlan et al. | 725/135 |
| 2004/0047623 A1 | 3/2004 | Top et al. | |
| 2004/0257436 A1 * | 12/2004 | Koyanagi et al. | 348/36 |
| 2005/0141607 A1 | 6/2005 | Kaplinsky | |
| 2006/0136972 A1 | 6/2006 | Metzger et al. | |
| 2007/0182819 A1 | 8/2007 | Monroe | |

OTHER PUBLICATIONS

Canadian Examination Report dated Jun. 8, 2012 for Canadian Application Serial No. 2,465,045, Canadian Filing Date: Apr. 22, 2004 consisting of 5 pages.

4th Canadian Examination Report dated Jul. 23, 2014 for corresponding Canadian Application Serial No. 2,465,045, Canadian Filing Date: Apr. 22, 2004, consisting of 2 pages.

\* cited by examiner

VIDEO USER INTERFACE SYSTEM AND METHOD

CROSS-REFERENCE TO RELATED APPLICATION

The present application is a continuation of pending U.S. application Ser. No. 10/802,451 filed Mar. 17, 2004 which claims the benefit of the filing date of U.S. Provisional Application Serial No. 60/502,728, filed Sep. 12, 2003, entitled "Video User Interface System and Method," the entire teachings of which are incorporated herein by reference. This application is related to U.S. application Ser. No. 10/803,004, filed Mar. 17, 2004, entitled "Imaging System and Method for Displaying and/or Recording Undistorted Wide-Angle Image Data."

BACKGROUND OF THE INVENTION

Field of the Invention

This invention generally relates to imaging systems, and more particularly, to a system and method for generating a graphical user interface from image data, such as video images.

Background Description

Conventional video surveillance systems allow users to view portions of monitored areas by either physically aiming a video camera at a desired portion or by generating a perspective corrected view of the desired portion from a wide angle (e.g., fisheye) image of the monitored area. One shortcoming of such conventional systems is that they do not conveniently enable a user to discern the part of the monitored area represented by the displayed portion. For example, a video surveillance system may display a close-up image of a person or an object (the displayed portion) in a room or a parking lot (the monitored area). Without an image of the entire room or lot and an indication of the area represented by the close-up image, it may be difficult or impossible to quickly determine the position of the person or object in the monitored room or lot. This is especially true for a crowded room or lot, where it may be difficult to distinguish one isolated portion from another.

Another shortcoming is that video surveillance systems typically do not allow an operator to see anything but the portions of monitored areas being displayed. The undisplayed portions may comprise a substantial portion of a monitored area, in which significant activity of interest may occur. For example, if a displayed image represents only 10% of a monitored parking lot, the other 90% may be unmonitored at any given time.

Yet another shortcoming is that high zoom factor images mathematically derived from wide-angle lens image data tend to exhibit low resolution. The greater the zoom factor, the lower the resolution. This impairs an operator's ability to distinguish fine details (e.g., facial features or automobile license plate numbers) in a monitored area.

While the invention overcomes one or more of the problems in conventional video surveillance systems as set forth above, it should be apparent that the invention may have applicability to a wide array of imaging devices and methods, particularly those employing images of moving objects, regardless of the particular format of the image data.

SUMMARY OF THE INVENTION

The invention avoids the drawbacks of the prior art by providing a graphical user interface that may, according to one aspect of the invention, include one or more panoramic views of a monitored area, one or more virtual views preferably corresponding to portions of the monitored area, and/or reference data such as a reference window overlaid in a panoramic view to identify a portion of the panoramic view corresponding to a virtual view. Panoramic views of the invention, which may be derived from wide-angle lens image data, exhibit a determined (e.g., upright) orientation and substantially reduced (or no) wide-angle image distortion, thus providing a readily discernible view. Virtual views of the invention, which may be based upon either transformed wide-angle lens image data or image data from a camera system without a wide-angle lens, also exhibit substantially reduced (or no) wide-angle image distortion, thus providing a readily discernible view. The virtual views and reference windows may respond to operator commands.

In particular, according to a first aspect of the invention, a system is provided for creating signals indicative of a graphical user interface from wide-angle image data, such as video images, corresponding to a monitored area. The system includes a buffer configured to receive wide-angle image data such as video images, corresponding to the monitored area. A processor operably coupled to the buffer is configured to transform wide angle image data received by the buffer into panoramic view data corresponding to at least one panoramic view of the monitored area, and into virtual view data corresponding to at least one virtual view of a portion of the at least one panoramic view.

In another aspect of the invention, a method of creating a graphical user interface is provided. The method includes the steps of buffering wide-angle data corresponding to a wide-angle image, such as a video image, of a monitored area; transforming the buffered data into panoramic data for at least one panoramic view using a panoramic transformation; and transforming portions of the buffered data into virtual view data for at least one virtual view using a virtual view transformation.

Additionally, the graphical user interface may include a reference window overlaid in a panoramic view to identify a portion of the panoramic view represented by a virtual view. As another option, the system may include a dome camera system configured to provide image data for a virtual view according to commands. The dome camera image data may exhibit higher resolution than the wide-angle data.

In yet another aspect of the invention, a system for creating signals indicative of a graphical user interface from wide-angle image data corresponding to a monitored area is provided. The system includes a means for storing wide-angle image data corresponding to a monitored area. The system also includes a means for processing and transforming data received from said storing means into panoramic view data corresponding to at least one panoramic view of the monitored area and into virtual view data corresponding to at least one virtual view of a portion of the at least one panoramic view.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate preferred embodiments of the invention and together with the detail description serve to explain the principles of the invention. In the drawings.

DETAILED DESCRIPTION

User Interface

Figure 1:
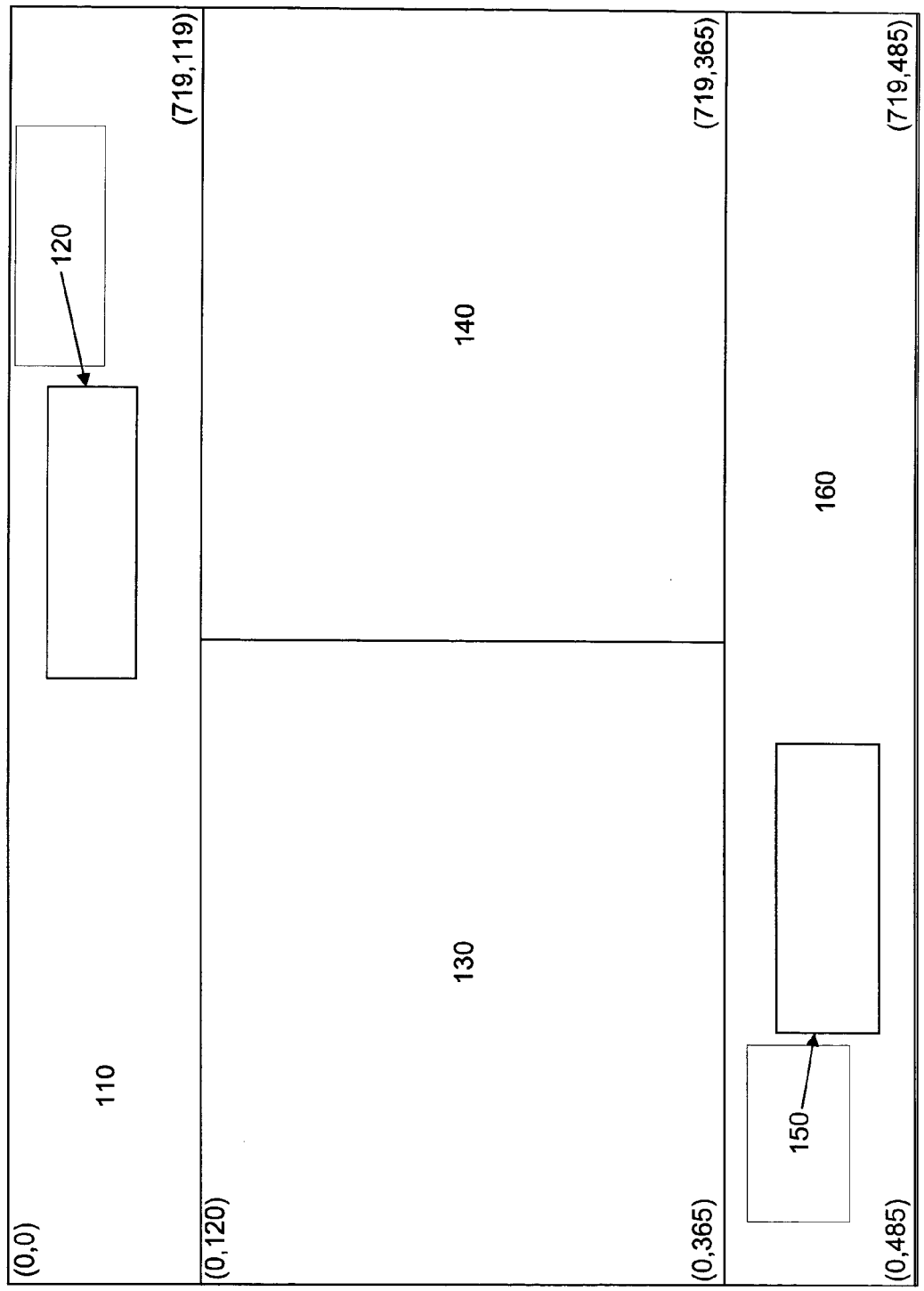
FIG. 1 is a block diagram that conceptually illustrates a graphical user interface constructed in accordance with the principles of the invention.

An exemplary system in accordance with the invention includes a processor configured to transform digital image data corresponding to the wide-angle images, such as video images, of a monitored area into data corresponding to one or more panoramic views of the monitored area. Referring to FIG. 1, a user interface in accordance with an exemplary implementation of the invention is conceptually shown. Strips 110 and 160, which may be rectangular in shape as illustrated, correspond to transformed panoramic views. The transformed panoramic views 110 and 160 exhibit upright orientation and substantially reduced (or no) wide-angle image distortion, thus providing a readily discernible view of the monitored area. Examples of a suitable transformation carried out by the processor are discussed subsequently.

The processor is also configured to provide data corresponding to one or more virtual views 130 and 140, each of which is an undistorted (or substantially undistorted) view of a user-determined portion of the panoramic views 110 and 160. Virtual view data may be obtained either by transformation of portions of the wide-angle video image data, or by positioning and focusing a camera having a normal lens (i.e., not a wide angle lens) or a telephoto lens to produce image data for the determined portion of the monitored area. Again, a suitable transformation to obtain the virtual view data is discussed subsequently.

The processor may be further configured to provide reference data (e.g., windows—i.e., graphically generated boxes or other shapes overlaid in the panoramic views—boxes 120 and 150 as shown in FIG. 1) corresponding to the undistorted view of the determined portions of the panoramic views represented by the virtual views 130 and 140. Thus, the reference data 120 and 150 reveals what portions of the panoramic views are represented by the virtual views 130 and 140.

As an operator pans, tilts or zooms either of the virtual views 130 and 140 to correspond to any part of either of panoramic views 110 and 160, the corresponding reference window 120 or 150 overlaid on top of a panoramic view 110 and 160 moves in the panoramic view 110 or 160, thus indicating the part of the panoramic view 110 and 160 represented by the virtual view 130 or 140.

The system is preferably configured to allow a user to select which virtual view 130 or 140 to currently control. The active (i.e., currently controlled) virtual view 130 or 140 may be distinguished from the inactive virtual view by an indicia. For example, a white frame may surround the active virtual window and a black frame may surround the inactive virtual view. The corresponding reference window 120 or 150 may also be highlighted in either black or white based on its associated virtual view's active/inactive status.

The exemplary display screen may have a resolution of 486 by 720 pixels. The exemplary panoramic views, as shown in FIG. 1, are each 720 pixels wide and 120 pixels high. The exemplary virtual views, as shown in FIG. 1, may each be 360 pixels wide and 246 pixels high. Those skilled in the art will appreciate that the invention is not limited to the exemplary resolution or view sizes. Many other resolutions and sizes are feasible and come within the scope of the invention.

The reference data (e.g., reference windows 120 and 150) may be controllable via a user input device, such as a joystick, cursors or other pointing device. Thus, for example, a user may move and resize reference windows 120 and 150 to cover any portions of the panoramic views 110 and 160. The portions of the panoramic views covered by the reference windows 120 and 150 correspond to or define the virtual views 130 and 140. The system may also automatically determine the portions of the panoramic views 110 and 160 to cover, such as by one or more determined algorithms (e.g., move reference windows as a function of time) or in response to one or more signals (e.g., a motion detector, gate sensor, or alarm signal). Other manifestations of reference data, such as numerical coordinates or cross hairs, may be used in lieu of or in addition to reference windows 120 and 150.

Panoramic views 110 and 160 and virtual views 130 and 140 may be displayed concurrently on a display monitor, thus providing a readily discernible view of the entire monitored area and an undistorted (or substantially undistorted) view of a portion of the monitored area. The reference data 120 and 150 may also be displayed with the panoramic views 110 and 160, thus enabling a user to readily identify the portions of the panoramic views 110 and 160 that are represented by the virtual views 130 and 140.

Those skilled in the art will appreciate that the invention is not limited to the exemplary number, size, shape or arrangement of panoramic views and/or reference windows shown in FIG. 1 and discussed above. For example, one or more panoramic views 110 and 160, virtual views 130 and 140 and or reference windows 120 and 150 may be provided without departing from the scope of the invention. Additionally, the user interface components may be arranged as shown in FIG. 1 and discussed above, or differently, on one or more display monitors, or in one or more windowed portions of one or more display monitors, without departing from the scope of the invention. Furthermore, the interface may be configured to allow a user to control the display arrangement. For example, a user may hide or move a panoramic view 110 or 160, and/or a virtual view 130 or 140 and/or a reference window 120 or 150; or hide all virtual views 130 and 140 reference windows 120 and 150; or opt to display only a selected panoramic view 110 or 160 or virtual view 130 or 140.

Hardware

Various image sources may supply image data for use by a system in accordance with the invention. By way of example and not limitation, one or more imagers such as digital or analog video cameras may be used to supply video data, which may be in any known format. Thus, unless otherwise apparent from the context, as used herein "video" broadly refers to images, such as images of stationary and/or moving objects, which may or may not be produced using signals in standard formats, such as NTSC signals. The system of the invention may operate in real time, processing video data as it is produced using the video imagers and without appreciably delaying output to a display monitor or recorder. Alternatively, saved analog or digital video signals or data may serve as the source of images.

Figure 2:
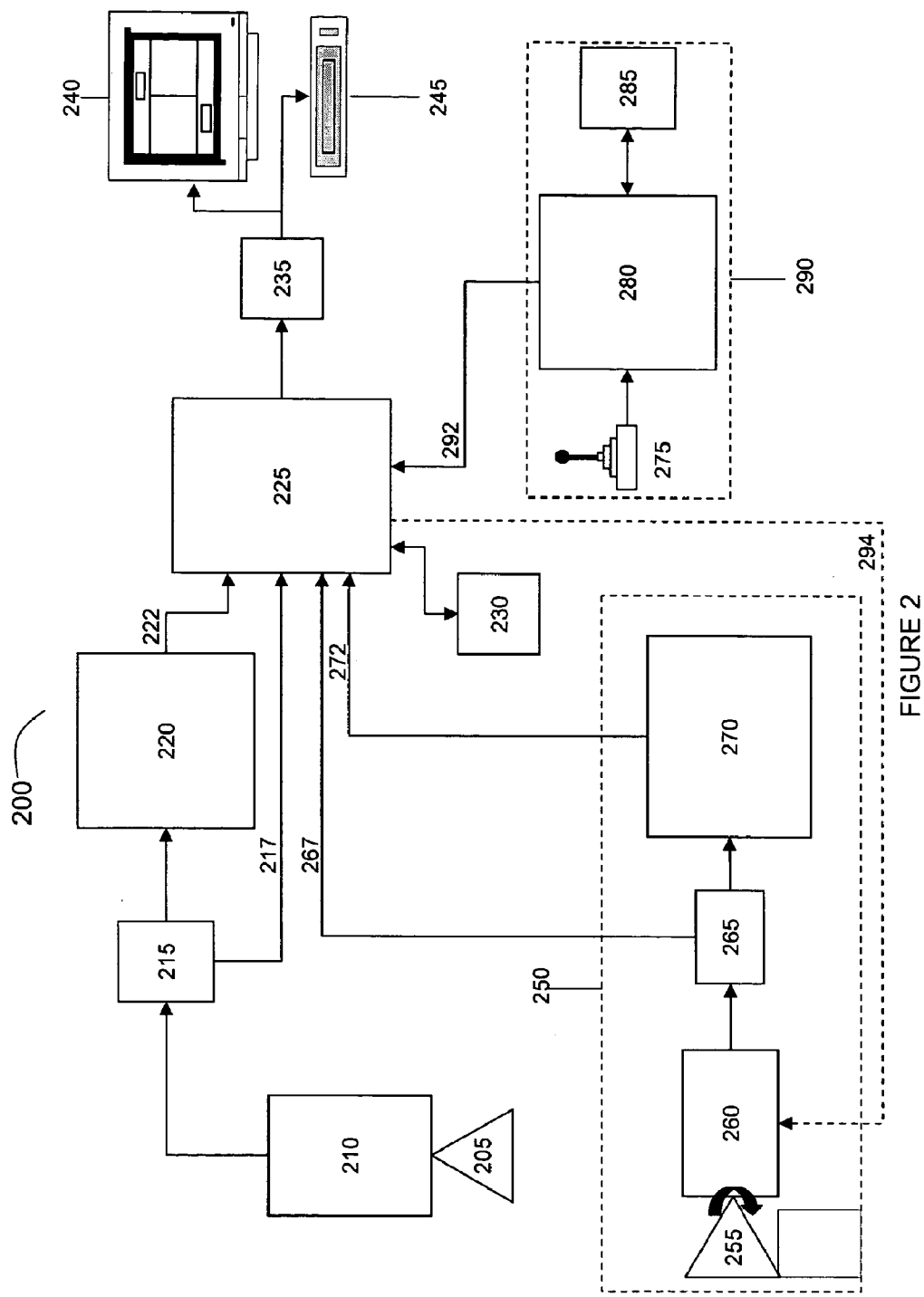
FIG. 2 is a block diagram that conceptually shows an imaging system for producing a graphical user interface in accordance with an exemplary embodiment of the invention.

Referring now to FIG. 2, a high-level block diagram of a video imaging system 200 for use with a system in accordance with an exemplary implementation of the invention is shown. The video imaging system 200 includes a video camera 210 equipped with a wide-angle lens 205, such as a fisheye lens. Various wide-angle lenses are available, many of which, for example, have an angular field of view of approximately 50 degrees or more. The wide-angle lens may preferably be suitable for producing an image of an entire area to be monitored (e.g., portions of a room excluding the ceiling) when the wide-angle lens is positioned at a determined point relative to the monitored area (e.g., on a ceiling of the room, at or near the center of the ceiling, pointing downwardly). By way of example and not limitation, a fisheye lens, which is a type of wide-angle lens, and which may have a field of view of 180 degrees, may be utilized. The camera 210 may be a digital camera such as a camera that employs a charge coupled device (CCD) array, a Time Delay Integration (TDI) CCD array, complementary metal oxide semiconductor (CMOS) image sensors or other sensors or devices for electronic image production. Alternatively, the camera 210 may be an analog camera that produces analog (e.g. NTSC or PAL) output signals.

The wide-angle lens 205 is aimed at the area to be monitored. The lens 205 may be a fisheye lens or another type of wide-angle lens that provides a 180° field of view, or a wider or narrower field of view. The position and orientation may generate a fisheye view of the entire monitored area.

A video decoder 215 operably coupled to the camera translates analog signals from the camera into digital video data. The decoder 215 may include a clock circuit (e.g., a 27 MHz video clock circuit) suitable for synchronization and processing of video image data streams. Clock signals 217 from the clock circuit may be transmitted to processor 225.

By way of example and not limitation, a suitable decoder 215 may include commercially available decoders, such as an SAA7113H 9-bit video input processor available from Phillips Electronics N.V. The SAA7113H 9-bit video input processor includes an anti-aliasing filter, an automatic clamp and gain control, a clock generation circuit, a digital multi-standard decoder, and a brightness, contrast and saturation control circuit. It is able to decode Phase Alternation Line (PAL), French Sequential Couleur avec Memoire (SECAM) and American National Television Systems Committee (NTSC) standard signals into CCIR-601 (International Radio Consultative Committee, now the International Telecommunication Union Radiocommunication Sector, standard for encoding analog video signals in digital form) compatible color component data values. The SAA7113H accepts as analog inputs CVBS (i.e., composite Chroma Video Blanking & Sync inputs) or S-video (Y/C).

Digital video data from decoder 215 may be stored in an image buffer 220. The image buffer 220 provides a means for storing wide-angle image data corresponding to a monitored area. The image buffer 220 may be comprised of volatile or non-volatile memory or other devices configured to store video image data. The data may be stored temporarily, for example, until no longer needed for transformation by the image data processor 225, as described below, until new video image data is required to be stored in the occupied portion of the buffer, or until some other event occurs or a period of time elapses. The buffer 220 may be sized to store image data corresponding to an entire field or frame of video, or more or less data.

One or more user input modules 290 may also be provided to generate user commands. By way of example, the module may include an input device 275 such as a keypad, digitizer, joystick, microphone and voice recognition module, or some other device configured to enable a user to enter commands. The input device 275 may be operably coupled to an input processor 280 and input memory 285 configured to produce user command data 292 corresponding to user input commands. The input processor 280 may be implemented as a special purpose computer; a programmed general purpose computer; a programmed microprocessor, microcontroller or programmable read-only memory and peripheral integrated circuit elements; an application specific integrated circuit (ASIC) or other integrated circuits; a digital signal processor; a hardwired electronic or logic circuit such as a discrete element circuit; a programmable logic device such as a field programmable gate array (FPGA), or the like. The input memory 285 may include volatile or non-volatile memory such as, for example, static random access memory (SRAM), dynamic random access memory (DRAM), fast page mode dynamic random access memory (FPM DRAM), extended data-out dynamic random access memory (EDO DRAM), synchronous dynamic random access memory (SDRAM), double data rate synchronous dynamic RAM (DDR SDRAM), electronically erasable programmable read only memory (EEPROM) such as flash memory with or without a controller, hard disk enabled virtual memory, and/or other data storage devices that may be operably coupled to the input processor 280. Using a user input device 275, a user may identify a portion of a panoramic view to be displayed as a virtual view. A user may also control zoom factors for virtual views, and other display parameters via the user input device 275.

An image data processor 225 may receive buffered image data 222, clock signals 217 and user command data 292 to produce panoramic view data, virtual view data and reference data. The image data processor 225 thus provides a means for processing and transforming data received from the storing means (i.e., the image buffer 220) into panoramic view data corresponding to at least one panoramic view of the monitored area and into virtual view data corresponding to at least one virtual view of a portion of the at least one panoramic view. The processor 225 may be implemented as a special purpose computer; a programmed general purpose computer; a programmed microprocessor, microcontroller or programmable read-only memory and peripheral integrated circuit elements; an application specific integrated circuit (ASIC) or other integrated circuits; a digital signal processor; a hardwired electronic or logic circuit such as a discrete element circuit; a programmable logic device such as a field programmable gate array (FPGA), or the like. A preferred implementation uses an FPGA or an ASIC as the processor 225. When a system design is considered stable, an FPGA could be replaced with an ASIC to reduce system cost.

The image data processor 225 may also be operably coupled to memory 230, which may, for example, be non-volatile memory in the form of electronically erasable programmable read only memory (EEPROM), such as flash memory, with or without a controller; a solid-state floppy-disk card (SSFDC) such as SmartMedia® memory commercially available from Kabushiki Kaisha Toshiba, Toshiba Corporation, and Toshiba America Electronic Components, Inc.; CompactFlash® memory by SanDisk Corporation; hard disk enabled virtual memory; and/or other non-volatile storage devices. Illustratively, memory 230 may be used to facilitate processor computations by storing one or more tables of values for frequently calculated functions, especially functions that might otherwise consume significant processor 225 resources. By way of example and not limitation, memory 230 may store a table of values, such as cosine, sine, 1/cosine, 1/sine, or other values based on trigonometric or other types of functions used in an applicable transformation algorithm, as discussed more fully below. The indices for the table may be angular values in degrees, radians, other types of measurements, or some other possible value for a variable. The table entries may be pre-calculated values based on the corresponding indices. Trigonometric functions and complex floating point calculations can otherwise be a time and resource consuming part of processor 225 calculations. The use of pre-determined stored values conserves processor resources and may lead to an appreciable increase in overall computation speed.

As discussed more fully below, the image data processor 225 mathematically transforms wide angle video image data in the image buffer 220 into panoramic views using a panoramic view transformation algorithm. Depending upon the implementation, the image data processor 225 may also transform wide angle video image data in the image buffer 220 into virtual views using a virtual view transformation algorithm, as discussed more fully below.

Upon transformation, the processor 225 sends transformed video data to an encoder 235. The encoder converts the digital video data into output signals compatible with an output device such as a display monitor 240 and/or video recorder 245.

By way of example and not limitation, the encoder may be any suitable commercially available decoder, such as an SAA7121H digital video encoder by Phillips Electronics, N.V. The SAA7121H digital video encoder circuit accepts CCIR compatible YUV data with 720 active pixels per line and encodes the digital YUV video data to NTSC, PAL, CVBS or S-video signals.

Output from the encoder 235 is sent to an output device, such as a standard display monitor 240 and/or video recorder 245. The display monitor may be any device configured to visually display images based on electronic video signals output from the encoder 235. The recorder may be any device configured to record video signals from the encoder 235 on removable or non-removable storage media such as, for example, a magnetic tape, diskette, CD-ROM, DVD, hard disk, memory (e.g., nonvolatile EEPROM) or the like. If both a display monitor 240 and recorder 245 are used, the devices may be configured in parallel or in series (e.g., without output from the video recorder being sent to a display monitor).

In an alternative embodiment, instead of transforming wide angle video image data in the image buffer 220 into a virtual view using a virtual view transformation algorithm, the image data processor 225 may generate virtual view data from video image data produced by a one or more additional camera systems 250. An additional camera system may include an analog or digital camera 260 with a normal lens 255 (i.e., not a wide angle lens) aimed at a determined portion of the monitored area. The lens 255 may have a narrower Field of View (FOV), e.g., 45°, which would provide higher resolution than wide-angle lens 205, thus providing a more detailed video image for a virtual view. Thus, the additional camera enables switching from a low resolution virtual view derived from wide-angle lens image data to a high resolution virtual view, with high zoom factor capability, produced using the additional camera system. This gives the user the ability to isolate small details of a monitored area.

The additional camera system 250 may also include a video decoder 265 that is operably coupled to the camera and configured to translate analog signals from the camera into digital video data. The decoder 265 may also include a clock circuit (e.g., a 27 MHz video clock circuit) suitable for synchronization and processing of video image data streams. Clock signals 267 may be transmitted to processor 225.

The additional camera system 250 may further include an image buffer 270. The image buffer 270 may be comprised of volatile or non-volatile memory or other devices configured to temporarily store video image data, such as, for example, static random access memory (SRAM), dynamic random access memory (DRAM), fast page mode dynamic random access memory (FPM DRAM), extended data-out dynamic random access memory (EDO DRAM), synchronous dynamic random access memory (SDRAM), double data rate synchronous dynamic RAM (DDR SDRAM), Rambus dynamic random access memory (RDRAM), multiport dynamic random access memory (MPDRAM), synchronous graphics RAM (SGRAM), electronically erasable programmable read only memory (EEPROM), hard disk enabled virtual memory and/or other data storage device. The buffer 270 may be sized to store image data corresponding to an entire field or frame of video, or more or less data. Buffered video data 272 may be transmitted to processor 225. That data may then be processed and encoded 235 for display in either virtual view 130 or 140.

Moreover, the additional camera system 250 may be configured as a programmable dome camera system. Dome cameras can typically rotate (i.e., pan) 360 degrees, and tilt and zoom according to control signals. The dome camera 260 may be coupled to a processor programmed to produce control signals causing the camera 260 to aim at particular portions of a monitored area in particular patterns. Alternatively, processor 225 may produce control data 294, based upon user command data 292 from user input module 290, to control positioning and movement of the dome camera. A control interface (not shown) may also be operably coupled to dome camera 260 and processor 225, as necessary to convert control data output from the processor 225 into signals for controlling dome camera 260 position, movement and zooming.

Transformation Methodologies

Referring again to FIG. 1, panoramic views 110 and 160 and virtual views 130 and 140 may be produced by transforming wide-angle image data (including fisheye image data) into 2-dimensional space, without distortion (or with substantially reduced distortion). Many such transformation processes (also referred to as dewarping, mapping, remapping, planar projection, conversion and perspective correction) are known in the art and can be adapted, in accordance with the teachings herein, to produce panoramic views 110 and 160 and virtual views 130 and 140 with linear perspective geometry from wide-angle image data (including fisheye image data). While the invention is not limited to any specific transformation processes, an exemplary panoramic view transformation and an exemplary virtual view transformation are described more fully below for use with a system of the invention employing fisheye lens image data.

The panoramic view transformation process involves mathematically transforming wide angle video image data into 2-dimensional space for producing panoramic views. The exemplary transformation entails determining, for each output window pixel coordinate, an address within the image buffer 220 for pixel data to be encoded and output to a display 240 and/or recorder 245. In a preferred implementation, this address calculation is timed such that the calculated address for each output pixel is ready just in time to feed the output encoder. This implementation advantageously eliminates the need for an output image buffer.

In an exemplary implementation, two panoramic views 110 and 160 are produced. One panoramic view 110 corresponds to half of the monitored area (e.g., a 0-180 degree panoramic view strip). The other panoramic view corresponds to the other half of the monitored area (e.g., a 181-360° panoramic view strip). Thus, in this implementation, the second panoramic view is offset from the first panoramic view by half of the field of view. The points dividing one half from the other half may be pre-programmed, user configurable or user controllable. The two panoramic views combined provide a full (e.g., a 360°)view of the monitored area.

The exemplary panoramic views are 720 pixels wide and 120 pixels high. Output window pixel coordinates range from −360 to +360 for Wx and from −60 to +60 for Wy. The Wx and Wy coordinates are derived from the output view column and line pixel counters, and together with the desired Zoom factor, are transformed into θ (i.e., the pan rotation angle around the Z-axis) and φ (the tilt rotation angle around the X-axis), as conceptually illustrated in FIG. 3. This information is then converted to an address in the input capture buffer. The data from this address is output to the encoder for display. The variables Pan, Tilt and Zoom may be programmed or commanded via user input module 290. Given:
Zoom_1x_Tilt_FOV=45°
ScaleFactorX(SFx)=180°/720 pixels=0.25°/pixel
Zoom Scale(ZS)=1 (Requested zoom factor ie: 1, 2, 3 etc.)
ScaleFactorY(SFy)=(Zoom_1x_FOV)×(1/ZS/120 pixels)
ScaleFactorY(SFy)=45°/120 pixels=0.375°/pixel
Pan=Requested Pan angle in degrees
Tilt=Requested Tilt angle in degrees
Wx=Output Window pixel x coordinate (−360 to +360)
Wy=Output Window pixel y coordinate (+60 down to −60)
IRx=Image buffer fisheye image X axis radius in pixels
IRy=Image buffer fisheye image Y axis radius in pixels
ICx=Image buffer fisheye image center X coordinate in pixels, as conceptually shown in FIG. 4
ICy=Image buffer fisheye image center Y coordinate in pixels, as conceptually shown in FIG. 4.

The horizontal component of the panoramic view (starting with output window upper left at −360,+120) is converted from pixel units to degrees (SFx). Each output pixel equates to 0.25 degrees (180°/720 pixels). The programmable Pan value is added to each pixel value. The second panoramic view 160 is offset from the first 110 by +180 degrees.

Therefore:

$$\theta = [(Wx+360) \times SFx] + Pan = [(Wx+360) \times 0.25] + Pan \quad \text{Equation 1}$$

$$\theta = 0.25 Wx + 90 + Pan \quad \text{Equation 2}$$

The vertical component of the panoramic view (starting with output window upper left at origin −360,+120) is converted from pixel units to degrees (SFy). Each vertical pixel equates to 0.375 degrees (45°/120 lines). The programmable Tilt value is added to each pixel value. The programmable zoom performs a scale (45°×(1/zoom))/120. Therefore, Zoom Scale equals 1.

$$\varphi = (\pi/2 - Tilt) - [(Wy+60) \times (SFy)] \quad \text{Equation 3}$$

$$\varphi = 90 - Tilt - 0.375 Wy - 22.5 \quad \text{Equation 4}$$

$$\varphi = 67.5 - (Tilt + 0.375 Wy) \quad \text{Equation 5}$$

$$\text{Radius} = -\varphi/\pi/2 \quad \text{Equation 6}$$

$$\text{Radius} = -\varphi/90 \quad \text{Equation 7}$$

Next, the input image X,Y (Ixy) pixel is calculated, as follows:

$$Ix = (\text{Radius} \times \cos(\theta) \times IRx) + ICx \quad \text{Equation 8}$$

$$Iy = (\text{Radius} \times \sin(\theta) \times IRy) + ICy \quad \text{Equation 9}$$

The image buffer 220 is preferably addressed as a 1024 byte by 1024 byte array. The memory location, in the image buffer for the pixel data is calculated by:

$$\text{PixelData} = (Iy \times 1024) + Ix \quad \text{Equation 10}$$

PixelData may then be sent to the encoder 235 for output to the output device such as a display monitor 240 and or a recorder 245. Pixel Data for each pixel comprising the panoramic views 110 and 160 may be determined in a similar manner.

Figure 3:
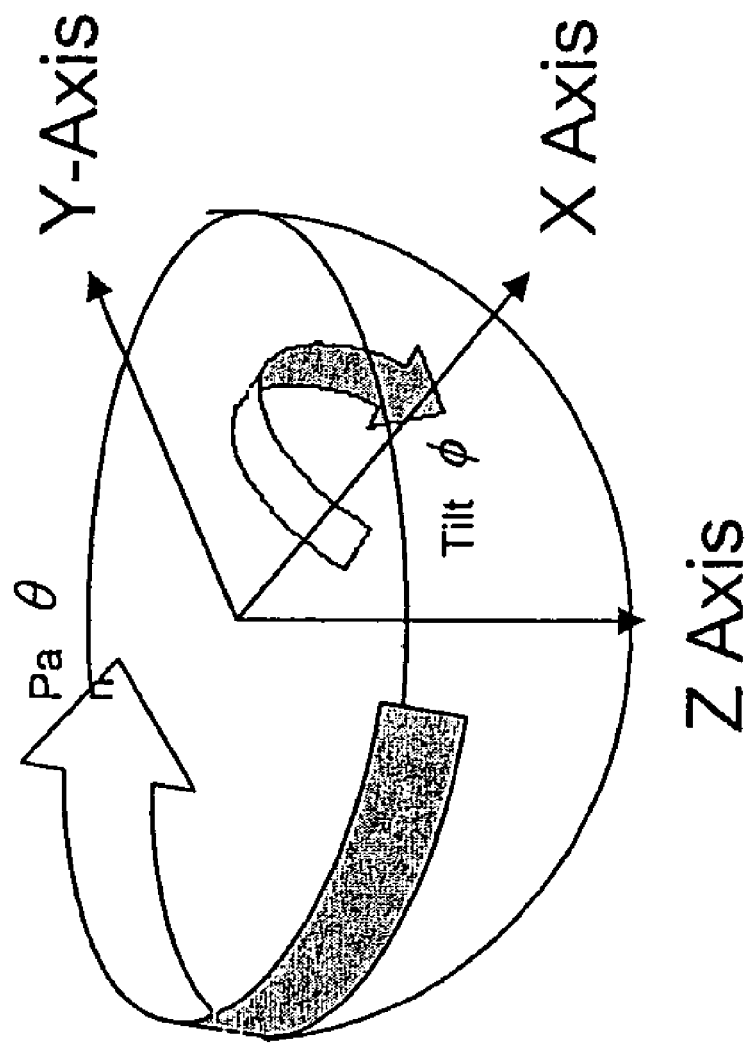
FIG. 3 conceptually shows θ (i.e., the pan rotation angle around the Z-axis) and φ (the tilt rotation angle around the X-axis) for a transformation in accordance with an exemplary implementation of the invention.
Figure 4:
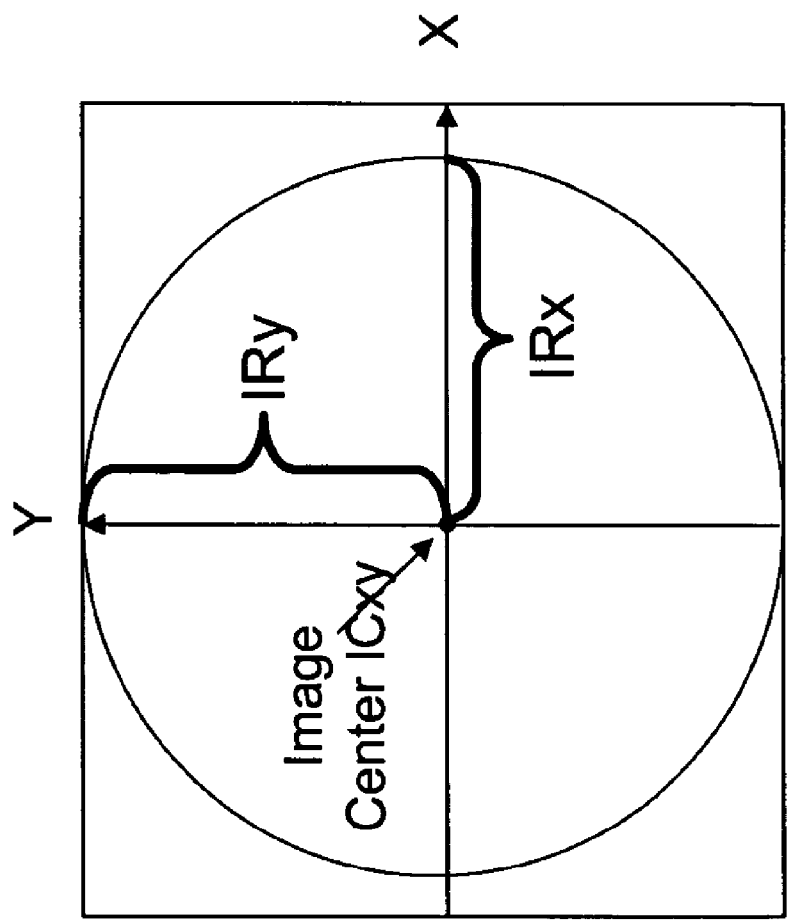
FIG. 4 conceptually shows image center ICxy based on image radii IRx and IRy in accordance with an exemplary implementation of the invention.

Each virtual view window 130 and 140 provides a perspective corrected view (e.g., a view with no, or substantially reduced, fisheye distortion) of any portion of a panoramic view 110 or 160. The virtual view windows are preferably 360 pixels wide and 240 pixels high. The center of the window is defined as 0,0. Wx values range from −180 to +180 and Wy values range from +120 down to −120. The Wx and Wy coordinates are taken from the output window line and pixel counters and, together with the desired Pan, Tilt and Zoom Scale, are transformed into θ, φ, and Radius using the virtual view transformation algorithm. The processor determines which algorithm (i.e., the virtual view transformation algorithm or the panoramic view transformation algorithm) to use based on where the counters indicate it is in the output video frame. As with the panoramic views, θ is defined as the Pan angle around the Z-Axis, where the positive Y direction, as shown in FIG. 3, is 0 degrees. Additionally, φ is the Tilt angle around the X-Axis where the positive Z direction, pointing straight down as shown in FIG. 3, is 0 degrees. Z is the perpendicular distance from the X-Y plane down to the surface of a unity radius hemispheric fisheye model.

The virtual view transformation algorithm entails converting the X and Y output window coordinates to an equivalent proportion of a unity radius hemisphere model using a current Zoom factor and a measured radius-X and radius-Y from an input fisheye circular image. These adjusted values are used to calculate a corresponding Z value. The X, Y and Z coordinates are rotated around the unity radius hemisphere model using the commanded Pan and Tilt from the user input module 290. The rotated X and Y values are then rescaled back to pixels and lines, based on measured radius-X and radius-Y from the input fisheye circular image. The rescaled X and Y are then converted to an address in the input capture buffer. Data from this address is then output to the encoder for display. The variables Pan, Tilt, and Zoom are the angle of interest commanded by the user input module 290.

Given:
Pan=Commanded Pan angle in degrees
Tilt=Commanded Tilt angle in degrees
Zoom=Requested Zoom scale (ie: 1,2,3,etc. ... )
Wx=Output Window pixel x coordinate (−180 to +180)
Wy=Output Window pixel y coordinate (+120 down to −120)
IRx=Image buffer fisheye image X axis radius in pixels
IRy=Image buffer fisheye image Y axis radius in pixels
ICx=Image buffer fisheye image center X coordinate in pixels, as conceptually shown in FIG. 4
ICy=Image buffer fisheye image center Y coordinate in pixels, as conceptually shown in FIG. 4.

The vertical and horizontal components of the virtual view window (center at origin 0,0) are converted from pixel units to unit values from 0 to less than one by dividing pixel number by the respective image radius. One is the maximum length from the center of the virtual output image, to the edge of the image. By scaling to the image radius much of the 3-dimensional transformation math can be simplified.

$$Wx = WindowX/IRx \qquad \text{Equation 11}$$

$$Wy = WindowY/IRy \qquad \text{Equation 12}$$

To scale the Wx and Wy components by Zoom, the following equations are used.

$$Wx = Wx \times 1/Zoom \qquad \text{Equation 13}$$

$$Wy = Wy \times 1/Zoom \qquad \text{Equation 14}$$

The desired radius squared is calculated from the vertical and horizontal components using the Pythagorean theorem.

$$Wr^2 = Wx^2 + Wy^2 \qquad \text{Equation 15}$$

For each pixel, to convert the two dimensional radius squared and scaled components to a three dimensional value with a unit radius of 1, the following equations are used.

Given:

$$Ix^2 + Iy^2 + Iz^2 = 1 \qquad \text{Equation 16}$$

Then:

$$Iz = \sqrt{1 - Wr^2} \qquad \text{Equation 17}$$

Assuming the acquired image center is perpendicular to the Z axis, a rotation of the desired window to a desired spot on the image can be performed using the Pan and Tilt values to simulate a movable dome.

To rotate around the X axis for tilt, the following equations are used.

$$Iz' = (Iz \times \cos(Tilt)) - (Wy \times \sin(Tilt)) \qquad \text{Equation 18}$$

$$Wy' = (Wy \times \cos(Tilt)) + (Iz \times \sin(Tilt)) \qquad \text{Equation 19}$$

To rotate around the Z axis for pan, the following equations are used.

$$Wx' = (Wx \times \cos(Pan)) - (Wy' \times \sin(Pan)) \qquad \text{Equation 20}$$

$$Wy' = (Wx \times \sin(Pan)) + (Wy' \times \cos(Pan)) \qquad \text{Equation 21}$$

To convert unit values to Image Buffer pixel units, the following equations are used.

$$Ix = Wx' \times IRx \qquad \text{Equation 22}$$

$$Iy = Wy' \times IRy \qquad \text{Equation 23}$$

To align the origin relative to upper left of input image buffer, the following equations are used.

$$Ix = Ix + ICx \qquad \text{Equation 24}$$

$$Iy = Iy + ICy \qquad \text{Equation 25}$$

The image buffer 220 may be addressed as a 1024 byte by 1024 byte array. The memory location, in the image buffer 220, for the pixel data is calculated using the $$PixelData = (Iy \times 1024) + Ix \qquad \text{Equation 26}$$

PixelData may then be sent to the encoder 235 for output to the display window.

Advantageously, the panoramic views 110 and 160 provided by the invention provide context for the virtual views 130 and 140. A user never loses sight as to what is happening in the monitored area outside a virtual view, even as the user zooms in on a specific event or object. The user does not have to keep changing video sources to view areas outside the virtual views 130 and 140. Concomitantly, the reference windows 120 and 150 provide a visual indication of the portion of a panoramic view represented by a virtual view. Thus a user can readily determine where in a monitored area they are looking. In an embodiment that includes an additional dome camera system, the ability to switch to the additional camera to produce a high resolution, high zoom factor, virtual view gives the user the ability to resolve small details of a scene.

Figure 5:
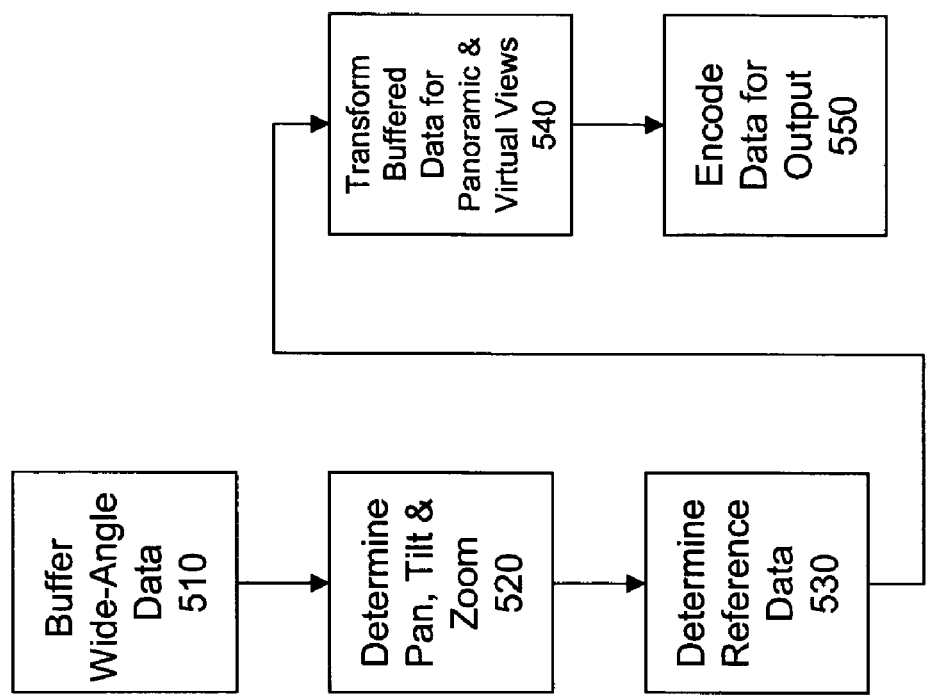
FIG. 5 is a high level flowchart conceptually illustrating steps of a methodology for creating a graphical user interface in accordance with an exemplary implementation of the invention.

Referring now to FIG. 5, a high level flow chart for a process of creating a video user interface in accordance with an exemplary implementation of the invention is shown. The steps may be implemented using a system with a programmed processor as described above. FIG. 5 may equally represent a high level block diagram of an exemplary system constructed in accordance with the invention, implementing the steps thereof.

In step 510, wide-angle data (e.g., fisheye lens image data) is buffered. The data may be supplied from a video camera system with a decoder or from a source of pre-recorded data.

Next, in step 520, pan, tilt and zoom angles are determined to specify regions of interest in the panoramic views for display in virtual views. Pan, tilt and zoom angles may be supplied by a programmed algorithm, a table or a user input module. Those skilled in the art will appreciate that values other than pan, tilt and zoom (e.g., Cartesian coordinate values) may be specified to define areas of interest in the panoramic views.

Next, in step 530, reference data for reference windows are determined. The reference data preferably corresponds to rectangular windows overlaying the virtual view regions of interest within the panoramic views. Preferably, the rectangular windows move according to a programmed algorithm, a table or user commands from a user input module. As the rectangular windows move, the virtual views correspondingly change.

Next, in step 540, buffered wide-angle data are transformed using a panoramic transformation algorithm for panoramic view data, and using a virtual view transformation algorithm for virtual view data.

Next, in step 550, the transformed data and reference data are encoded for output. The transformed data defines any other virtual views and the panoramic views. The reference data defines the reference windows. The encoded output may be sent to a display monitor and/or to a recorder.

Those skilled in the art will appreciate that the order in which some of the steps may vary from the order shown in the flowchart without departing from the scope of the invention. For example, reference data may be determined before, after or during transformation of the buffered data. Additionally, a pre-programmed pan, tilt and zoom may be determined before wide-angle data is initially buffered.

Figure 6:
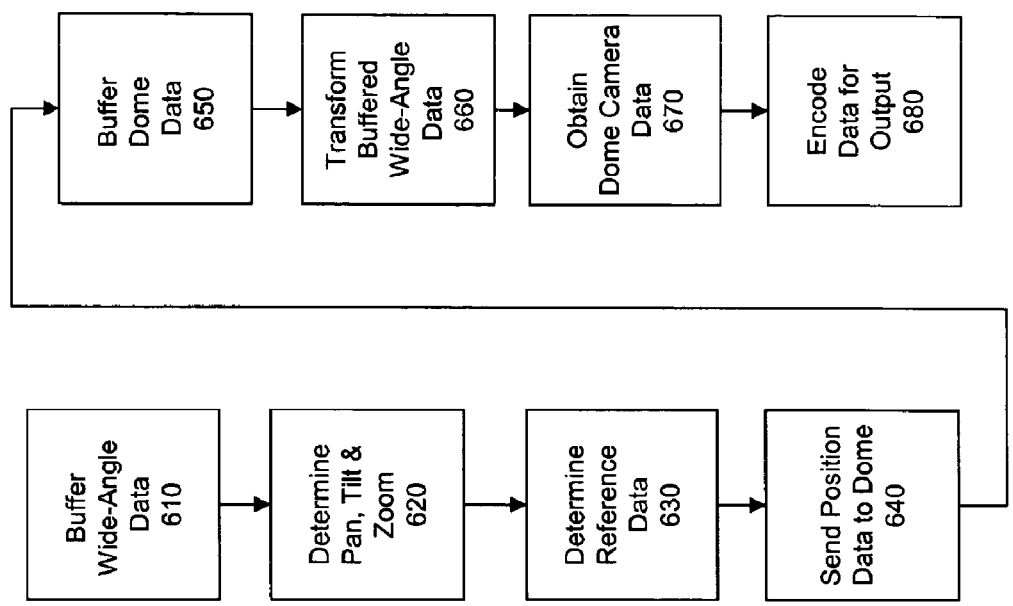
FIG. 6 is a high level flowchart conceptually illustrating steps of a methodology for creating a graphical user interface including using dome camera system positioning in accordance with an exemplary implementation of the invention.

Referring now to FIG. 6, a high level flow chart for another process of creating video user interface in accordance with an exemplary implementation of the invention is shown. As with the process illustrated by the flowchart of FIG. 5, the steps may be implemented using a system with a programmed processor as described above. FIG. 6 may equally represent a high level block diagram of an exemplary system constructed in accordance with the invention, implementing the steps thereof.

In step 610, wide-angle data (e.g., fisheye lens image data) is buffered. The data may be supplied from a video camera system with a decoder or from a source of pre-recorded data.

Next, in step 620, pan, tilt and zoom angles are determined to specify regions of interest in the panoramic views for display in virtual views. Pan, tilt and zoom angles may be supplied by a programmed algorithm, a table or a user input module. Those skilled in the art will appreciate that values other than pan, tilt and zoom (e.g., Cartesian coordinate values) may be specified to define areas of interest in the panoramic views.

Next, in step 630, reference data for reference windows are determined. The reference data preferably corresponds to rectangular windows overlaying the virtual view regions of interest within the panoramic views. Preferably, the rectangular windows move according to a programmed algorithm, a table or user commands from a user input module. As the rectangular windows move, the virtual views correspondingly change.

Next, in step 640, position data is communicated to a dome camera system. The communicated position data will cause the dome camera to aim at and zoom to the region of the monitored area corresponding to the determined pan, tilt and zoom values.

In step 650, dome camera data is buffered. The buffered data may be encoded, without transformation, for output to a display monitor and/or to a recorder as a virtual view.

Next, in step 660, buffered wide-angle data are transformed using a panoramic transformation algorithm for panoramic view data, and using a virtual view transformation algorithm for virtual view data.

Next, in step 670, buffered dome camera data are obtained for encoding. The dome camera data may be obtained from a dome camera buffer by a processor and communicated with transformed wide-angle data for encoding.

Next, in step 680, the transformed data, dome camera data and reference data are encoded for output. The dome camera data defines one virtual view. The transformed data defines any other virtual views and the panoramic views. The reference data defines the reference windows. The encoded output may be sent to a display monitor and/or to a recorder.

Those skilled in the art will appreciate that the order in which some of the steps are performed may not be important. For example, the reference data may be determined before, after or during transformation of the buffered data. Additionally, by way of example, a pre-programmed pan, tilt and zoom may be determined before the wide-angle data is initially buffered. As another example, dome position data may be sent before reference data is determined. As yet another example, dome data may be buffered after transformation of wide-angle data. Also, dome camera data may be obtained by the processor before completion of transformation. Such variations in order are intended to come within the scope of the invention.

Although the foregoing description is directed to preferred embodiments of the invention, it is noted that other variations and modifications will be apparent to those skilled in the art, and may be made without departing from the spirit or scope of the invention.

What is claimed is:

1. A system providing a graphical user interface, the system comprising:
   a first camera configured to capture fisheye image data using a fisheye lens;
   a buffer configured to receive the fisheye image data corresponding to a monitored area; and
   a processor in communication with the buffer, the processor configured to:
      transform the fisheye image data into panoramic view data corresponding to an undistorted panoramic view of the monitored area using a panoramic transformation process;
      transform the fisheye image data into virtual view data corresponding to a partial view of the panoramic view using a virtual view transformation process different from the panoramic view transformation process;
      encode the panoramic view data and the virtual view data for display in the graphical user interface;
      determine reference data corresponding to an area in the panoramic view represented by a virtual view, the virtual view corresponding to the virtual view data; and
      overlay a reference window over the area in the panoramic view represented by the virtual view based on the reference data.

2. The system according to claim 1, further comprising:
   a user input module configured to provide user command data to the processor; and
   the processor being further configured to determine the partial view of the panoramic view based on the user command data.

3. The system according to claim 1, wherein a size and a position of the reference window is determined according to the user command data.

4. The system according to claim 1, further comprising a second camera in communication with the buffer and the processor, the second camera being configured to capture non-fisheye image data of a portion of the monitored area according to pan, tilt and zoom (PTZ) command data; and
   the processor being further configured to allow switching between the virtual view data and the captured non-fisheye image data for display.

5. The system according to claim 1, wherein the transforming of fisheye image data to panoramic data and virtual view data occurs in real time.

6. A system according to claim 1, wherein:
   the panoramic view includes a first panoramic view and a second panoramic view, the first panoramic view corresponding to a first portion of the monitored area, and the second panoramic view corresponding to a remaining portion of the monitored area;
   the virtual view includes a first virtual view and a second virtual view, the first virtual view corresponding to a first portion of the first panoramic view, and the second virtual view corresponding to a second portion of the second panoramic view; and a combination of the first panoramic view and the second panoramic view provide a 360° view of the monitored area relative to a vertical axis.

7. A method of generating a graphical user interface, the method comprising:

capturing fisheye image data with a first camera using a fisheye lens;

buffering fisheye image data corresponding to a wide-angle image of a monitored area;

transforming the fisheye image data into panoramic view data corresponding to an undistorted panoramic view of the monitored area;

transforming the fisheye image data into virtual view data corresponding to a portion of the panoramic view;

encoding the panoramic view data and the virtual view data for display in the graphical user interface;

determining reference data corresponding to an area in the panoramic view represented by a virtual view, the virtual view corresponding to the virtual view data; and overlaying a reference window over an area in the panoramic view represented by the virtual view based on the reference data.

8. The method of claim 7, further comprising:

receiving user command data; and determining the portion of the panoramic view based on the user command data.

9. The method of claim 7, wherein a size and a position of the reference window is determined according to the user command data.

10. The method according to claim 7, wherein the buffered fisheye image data is received from a first video camera system; and the method further comprising:
communicating pan, tilt and zoom commands to a second camera system;
receiving non-fisheye image data for the virtual view from the second camera system; and
switching from using the virtual view data based on the transformation of the fisheye image data to using the non-fisheye image data from the second camera system for display.

11. The method according to claim 7, further comprising encoding reference data, virtual view data and panoramic view data for output.

12. The method of claim 7, wherein the transforming of fisheye image data to panoramic data and virtual view data occurs in real time.

13. The method according to claim 7, wherein the panoramic view includes:

a first panoramic view corresponding to a first portion of the monitored area;

a second panoramic view corresponding to a remaining portion of the monitored area; and the first panoramic view and the second panoramic view combine to provide a 360° view of the monitored area relative to a vertical axis; and the method further comprising encoding the first panoramic view, the second panoramic view, and virtual view of a portion of at least one of the first panoramic view and the second panoramic view for simultaneous display.

14. A system for providing a graphical user interface for display of a panoramic view and virtual view, the system comprising:

a first camera, the first camera configured to capture fisheye image data using a fisheye lens, the fisheye image data corresponding to a monitored area;

a second camera, the second camera configured to capture non-fisheye image data of a portion of the monitored area according to pan, tilt and zoom (PTZ) command data;

an image buffer, the image buffer configured to receive the fisheye image data and the non-fisheye image data; and a processor in communication with the image buffer, the processor configured to:
transform the fisheye image data into panoramic view data corresponding to a panoramic view of the monitored area;
transform the fisheye image data into virtual view data corresponding to a partial view of the panoramic view;
encode the panoramic view data and the virtual view data for display in the graphical user interface;
determine reference data corresponding to an area in the panoramic view represented by a virtual view, the virtual view corresponding to the virtual view data;
overlay a reference window over an area in the panoramic view represented by the virtual view based on the reference data; and
switch from encoding virtual view data to encoding non-fisheye data for display with the panoramic view data in the graphical user interface.

15. The system of claim 14, further comprising:

a user input module, the user input module configured to provide user command data to the processor; and the processor is further configured to determine the partial view of the panoramic view based on the user command data.

16. The system according to claim 15, wherein a size and a position of a reference window is determined according to the user command data.

17. The system according to claim 14, wherein:

the panoramic view includes a first panoramic view and a second panoramic view, the first panoramic view corresponding to a first portion of the monitored area, and the second panoramic view corresponding to a remaining portion of the monitored area;

the virtual view includes a first virtual view and a second virtual view, the first virtual view corresponding to a first portion of the first panoramic view, and the second virtual view corresponding to a second portion of the second panoramic view; and the first panoramic view and the second panoramic view providing a 360° view of the monitored area relative to a vertical axis.

* * * * *